(12) United States Patent
Devlin et al.

(10) Patent No.: US 11,246,447 B2
(45) Date of Patent: Feb. 15, 2022

(54) ADJUSTABLE BREW HEAD LINKAGE

(71) Applicant: Rockwell Collins, Inc., Cedar Rapids, IA (US)

(72) Inventors: Byron A. Devlin, Kansas City, MO (US); Keevin P. Stutheit, Olathe, KS (US); Mudar S. Abu-Saymeh, Olathe, KS (US); Keith R. DeBald, Gardner, KS (US)

(73) Assignee: Rockwell Collins, Inc., Cedar Rapids, IA (US)

( * ) Notice: Subject to any disclaimer, the term of this patent is extended or adjusted under 35 U.S.C. 154(b) by 373 days.

(21) Appl. No.: 16/356,488

(22) Filed: Mar. 18, 2019

(65) Prior Publication Data

US 2020/0297154 A1    Sep. 24, 2020

(51) Int. Cl.
*A47J 31/44*   (2006.01)
*A47J 31/36*   (2006.01)
*A47J 31/06*   (2006.01)

(52) U.S. Cl.
CPC ....... *A47J 31/3604* (2013.01); *A47J 31/0647* (2013.01); *A47J 31/0684* (2013.01); *A47J 31/4407* (2013.01); *A47J 31/4482* (2013.01)

(58) Field of Classification Search
CPC ............... A47J 31/0647; A47J 31/4482; A47J 31/4475; A47J 31/4478
USPC .................................................. 99/284, 315
See application file for complete search history.

(56) References Cited

U.S. PATENT DOCUMENTS 9,021,938 B2 * 5/2015 Duvall .................... A47J 31/22
                                                    99/289 R
9,163,893 B1 * 10/2015 Gutierrez ................ F41A 23/02

2004/0005384 A1    1/2004 Cai
2005/0183580 A1 *  8/2005 Kaminishi .......... A47J 37/1276
                                                    99/284
2006/0266222 A1   11/2006 Hammad
(Continued)

FOREIGN PATENT DOCUMENTS

DE    2919523 A1 * 11/1979 .......... A47J 31/0647
WO    9940827 A1    8/1999
(Continued)

OTHER PUBLICATIONS

Search Report for European Application No. 19216035.6 dated Jun. 25, 2020, 6 pages.

*Primary Examiner* — Reginald Alexander
(74) *Attorney, Agent, or Firm* — Suiter Swantz pc llo

(57) ABSTRACT

An adjustable brew head linkage includes a brew head linkage element, a handle linkage element, and an adjusting element between the brew head linkage element and the handle linkage element to smoothly increase and decrease the distance between the brew head linkage element and the handle linkage element to alter the size of a corresponding brew chamber to accommodate various brew pods. The brew head linkage element and/or handle linkage element may include a threaded portion to engage the adjusting element. Turning the adjusting element causes deflection. Threaded portions may have opposite handedness or different pitches. A secondary brew head linkage locking element provides friction to lock the adjusting element in place. The adjusting element increases and decreases the distance between the head linkage and the handle linkage in increments smaller than 0.178 millimeters (7/1000 inches).

14 Claims, 6 Drawing Sheets

(56) References Cited

U.S. PATENT DOCUMENTS

2006/0266225 A1   11/2006  Hammad
2008/0095903 A1    4/2008  Weijers
2008/0121111 A1    5/2008  Paget et al.

FOREIGN PATENT DOCUMENTS

WO    WO-2004112556 A1 * 12/2004 .......... A47J 31/0668
WO       2012063273 A1    5/2012

* cited by examiner

ADJUSTABLE BREW HEAD LINKAGE

BACKGROUND

Brewing machines utilized in aircraft and aerospace applications are designed to accept brew pods. Brew pods often vary in size and shape due to the corresponding sizes and shapes of components in their native brewing machines. The variance in the brew pods affect how the brew pods sit in a brew cavity defined within a brew chamber. An incorrectly-seated brew pod may alter the pressure within the brew cavity, resulting in sub-optimal brew time and temperature necessary to produce a particular brewed product (e.g., coffee, espresso, tea, or the like).

A brew head linkage is a connection between a user operated brew handle and a movable brew head of a brewing machine. The linkage translates the rotary motion of the brew handle shaft to the linear motion of the brew head. The linear motion applies a force to seal a brew pod within the brew cavity. Features of the brew head linkage are defined by the components of the brew chamber and corresponding brew pod.

SUMMARY

In one aspect, embodiments of the inventive concepts disclosed herein are directed to a brew head linkage that is finely adjustable; such brew head linkage may be useful in a brewing machine, such as used in an aircraft galley. The brew head linkage includes a brew head engaging linkage element, a handle engaging linkage element, and an adjusting element between the head engaging linkage element and the handle engaging linkage element. The adjusting element smoothly increases and decreases the distance between the brew head engaging linkage element and the handle engaging linkage element to alter the size of a corresponding brew chamber to accommodate various brew pods.

In another aspect, the brew head engaging linkage element includes a threaded portion to engage a first threaded portion of the adjusting element and the handle engaging linkage element includes a threaded portion to engage a second threaded portion of the adjusting element. Turning the adjusting element causes deflection on both threaded portions. In another aspect, the first threaded portion and the second threaded portion have opposite handedness. Alternatively, the first threaded portion and the second threaded portion have the same handedness but different pitches.

In another aspect, a secondary head linkage locking element disposed on the brew head engaging linkage element engaging the threaded portion to provide friction to lock the adjusting element in place.

In another aspect, the handle engaging linkage element defines a first pin through-hole and a second pin through-hole, angularly offset such that the handle engaging element may be rotated ninety degrees, if necessary, to re-align certain threads in the adjusting element.

In another aspect, the adjusting element increases and decreases the distance between the brew head engaging linkage element and the handle engaging linkage element in increments smaller than 0.178 millimeters (7/1000 inches).

It is to be understood that both the foregoing general description and the following detailed description are exemplary and explanatory only and should not restrict the scope of the claims. The accompanying drawings, which are incorporated in and constitute a part of the specification, illustrate exemplary embodiments of the inventive concepts disclosed herein and together with the general description, serve to explain the principles.

BRIEF DESCRIPTION OF THE DRAWINGS

The numerous advantages of the embodiments of the inventive concepts disclosed herein may be better understood by those skilled in the art by reference to the accompanying figures in which.

DETAILED DESCRIPTION

Figure 1:
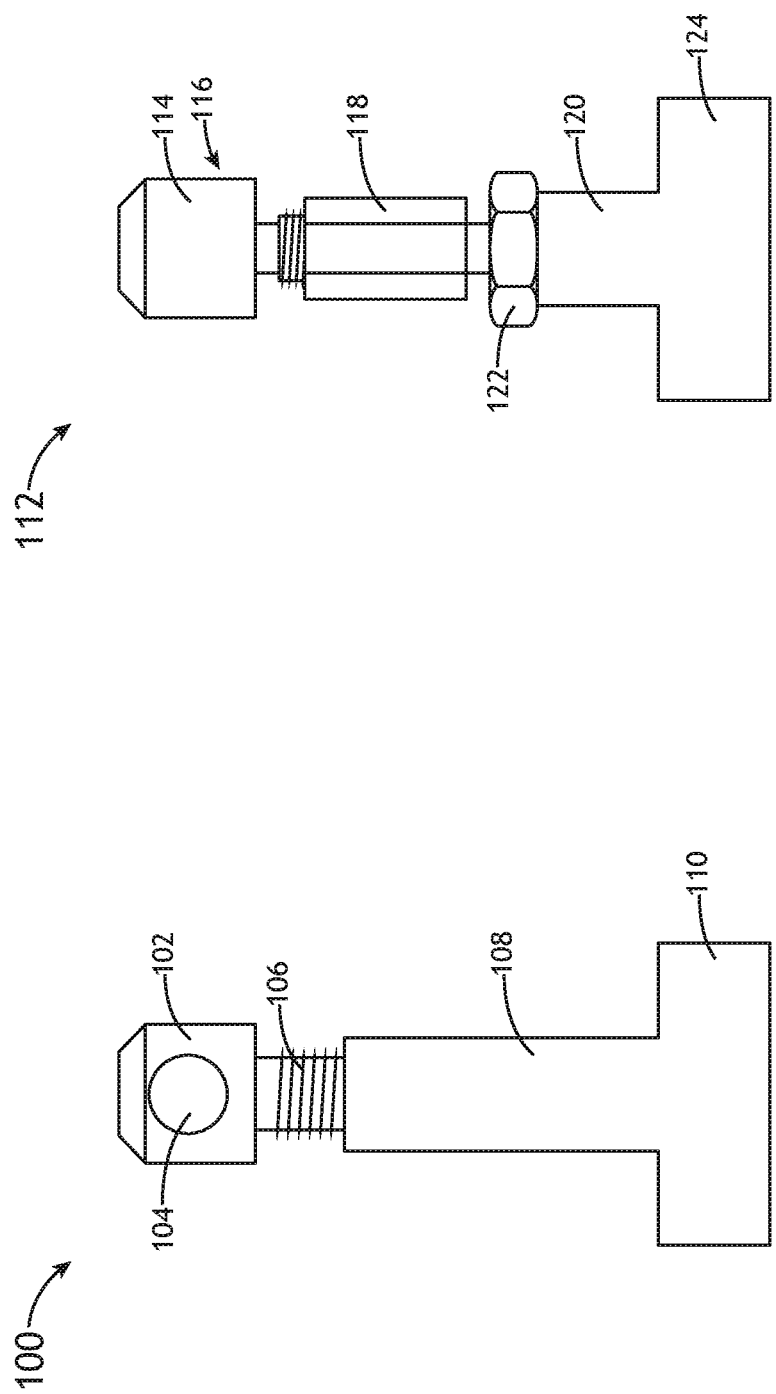
FIG. 1 shows front views of exemplary embodiments of adjustable brew head linkages.

Before explaining at least one embodiment of the inventive concepts disclosed herein in detail, it is to be understood that the inventive concepts are not limited in their application to the details of construction and the arrangement of the components or steps or methodologies set forth in the following description or illustrated in the drawings. In the following detailed description of embodiments of the instant inventive concepts, numerous specific details are set forth in order to provide a more thorough understanding of the inventive concepts. However, it will be apparent to one of ordinary skill in the art having the benefit of the instant disclosure that the inventive concepts disclosed herein may be practiced without these specific details. In other instances, well-known features may not be described in detail to avoid unnecessarily complicating the instant disclosure. The inventive concepts disclosed herein are capable of other embodiments or of being practiced or carried out in various ways. Also, it is to be understood that the phraseology and terminology employed herein is for the purpose of description and should not be regarded as limiting.

As used herein a letter following a reference numeral is intended to reference an embodiment of the feature or element that may be similar, but not necessarily identical, to a previously described element or feature bearing the same reference numeral (e.g., 1, 1a, 1b). Such shorthand notations are used for purposes of convenience only, and should not be construed to limit the inventive concepts disclosed herein in any way unless expressly stated to the contrary.

Further, unless expressly stated to the contrary, "or" refers to an inclusive or and not to an exclusive or. For example, a condition A or B is satisfied by anyone of the following: A is true (or present) and B is false (or not present), A is false (or not present) and B is true (or present), and both A and B are true (or present).

In addition, use of the "a" or "an" are employed to describe elements and components of embodiments of the instant inventive concepts. This is done merely for convenience and to give a general sense of the inventive concepts, and "a" and "an" are intended to include one or at least one and the singular also includes the plural unless it is obvious that it is meant otherwise.

Finally, as used herein any reference to "one embodiment," or "some embodiments" means that a particular element, feature, structure, or characteristic described in connection with the embodiment is included in at least one embodiment of the inventive concepts disclosed herein. The appearances of the phrase "in some embodiments" in various places in the specification are not necessarily all referring to the same embodiment, and embodiments of the inventive concepts disclosed may include one or more of the features expressly described or inherently present herein, or any combination of sub-combination of two or more such features, along with any other features which may not necessarily be expressly described or inherently present in the instant disclosure.

Broadly, embodiments of the inventive concepts disclosed herein are directed to a brew head linkage that is finely adjustable for use with brew pods in a brewing machine in an aircraft galley. The brew head linkage includes a head engaging linkage element, a handle engaging linkage element, and an adjusting element between them. The adjusting element smoothly increases and decreases the distance between the head engaging linkage element and the handle engaging linkage element to alter the size of a corresponding brew chamber to accommodate various brew pods.

Referring to FIG. 1, front views of exemplary embodiments of adjustable brew head linkages are shown. A discrete adjustable linkage 100 includes a handle engaging linkage element 102 that defines one or more pin through-holes 104. The handle engaging linkage element 102 includes a threaded portion 106 configured to engage a corresponding threaded portion defined by a head engaging linkage element 108. A pin connects the handle engaging linkage element 102 to a corresponding rotating handle element via one of the one or more pin through-holes 104. In one embodiment, such pin may be disengaged from the handle engaging linkage element 102 and rotated ninety degrees)(90° (or some multiple thereof) to increase or decrease the distance between the handle engaging linkage element 102 and a brew head engaging portion 110 of the head engaging linkage element 108.

In another embodiment, a smoothly adjustable linkage 112 includes a handle engaging linkage element 114 that defines a pin through-hole 116 (obscured) for rotatably attaching the handle engaging linkage element to a rotating handle element. An adjusting element 118 is disposed between the handle engaging linkage element 114 and a brew head engaging linkage element 120. The adjusting element 118 may be rotated to increase or decrease the distance between the handle engaging linkage element 114 and a brew head engaging portion 124 of the head engaging linkage element 120.

In at least one embodiment, the adjusting element 118 is rotatably attached to the handle engaging linkage element 114 and engaged to the head engaging linkage element 120 via threaded connectors. In at least one embodiment, a locking element 122 defines threads configured to engage the threaded connector of the adjusting element 118. The locking element 122 may be tightened against the head engaging linkage element 120 to maintain the desired distance by preventing the adjusting element 118 from rotating.

Figure 2:
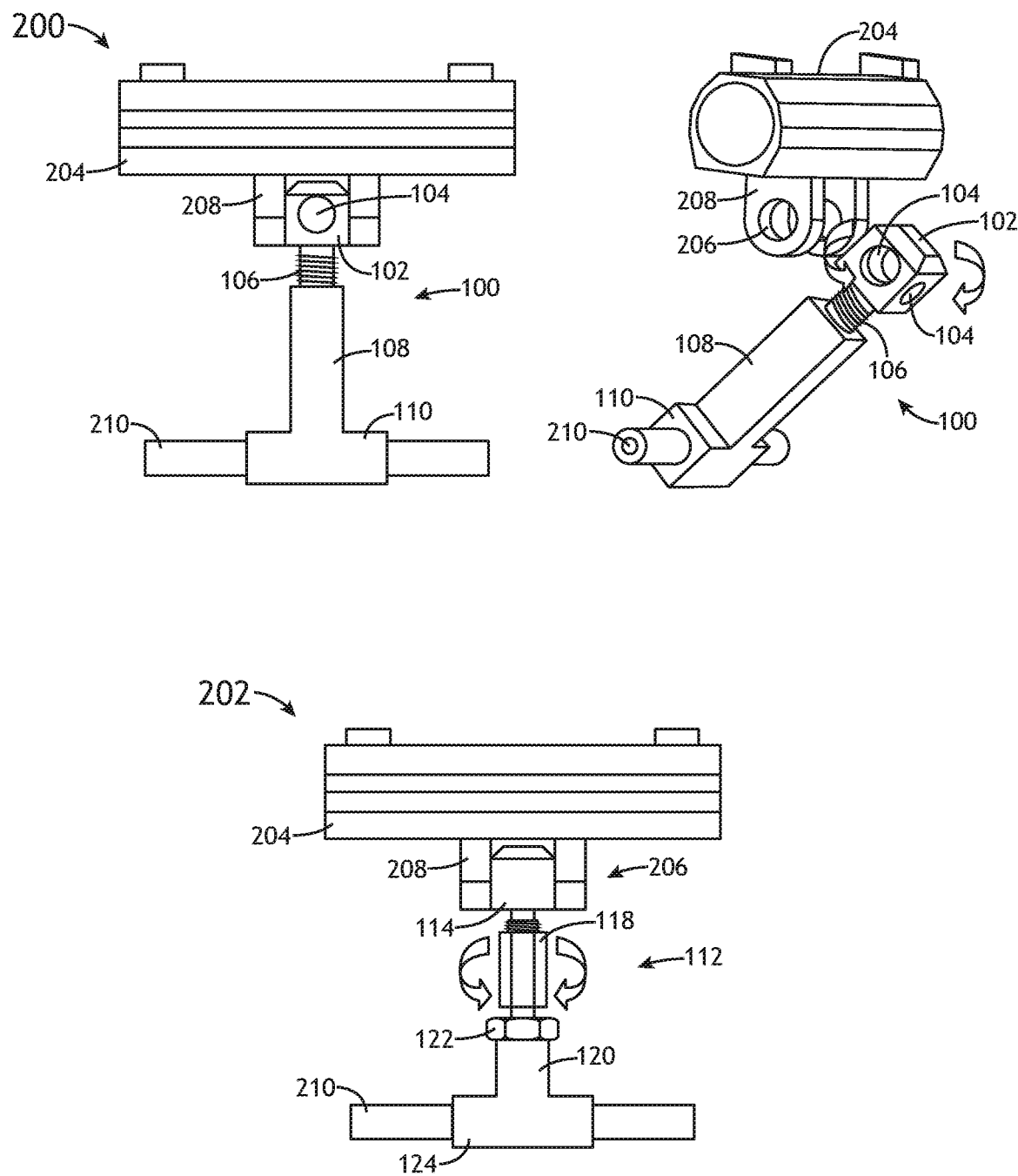
FIG. 2 shows front views and a perspective view of exemplary embodiments of adjustable brew head linkages.

Referring to FIG. 2, front views and a perspective view of exemplary embodiments of adjustable brew head linkages are shown. A discrete embodiment 200 includes a discrete adjustable linkage 100 with a handle engaging linkage element 102 that defines one or more pin through-holes 104 and a threaded portion 106 configured to engage a corresponding threaded portion defined by a brew head engaging linkage element 108. A pin (not shown) connects the handle engaging linkage element 102 to a corresponding rotating handle element 204 via one of the one or more pin through-holes 104 and corresponding rotating handle pin through-holes 206 defined by rotating handle flanges 208 affixed to a surface of the rotating handle element; such pin may be disengaged from the handle engaging linkage element 102 and rotated ninety degrees (90°) (or some multiple thereof) to increase or decrease the distance between the handle engaging linkage element 102 and a brew head engaging portion 110 of the brew head engaging linkage element 108.

Alternatively, or in addition, a continuous embodiment 202 includes a smoothly adjustable linkage 112 with a handle engaging linkage element 114 that defines a pin through-hole (obscured) for rotatably attaching the handle engaging linkage element 112 to the rotating handle element 204 via a pin through the rotating handle pin through-hole 206 (obscured) defined by the rotating handle flanges 208. An adjusting element 118 is disposed between the handle engaging linkage element 114 and a brew head engaging linkage element 120 to increase or decrease the distance between the handle engaging linkage element 114 and a brew head engaging portion 124 of the head engaging linkage element 120 without disengaging the handle engaging linkage element 114 from the rotating handle element 204.

In at least one embodiment, the brew chamber engaging portions 110, 124 may be affixed to or otherwise configured to receive extension elements 210 for engaging the corresponding linkage 100, 112 to a brew head assembly. Alternatively, the extension elements 210 may be configured to engage guide elements in a brewing machine to help translate the rotational motion of the rotating handle element 204 into linear motion of a brew head associated with the brew head engaging linkage element 110, 120.

Figure 3:
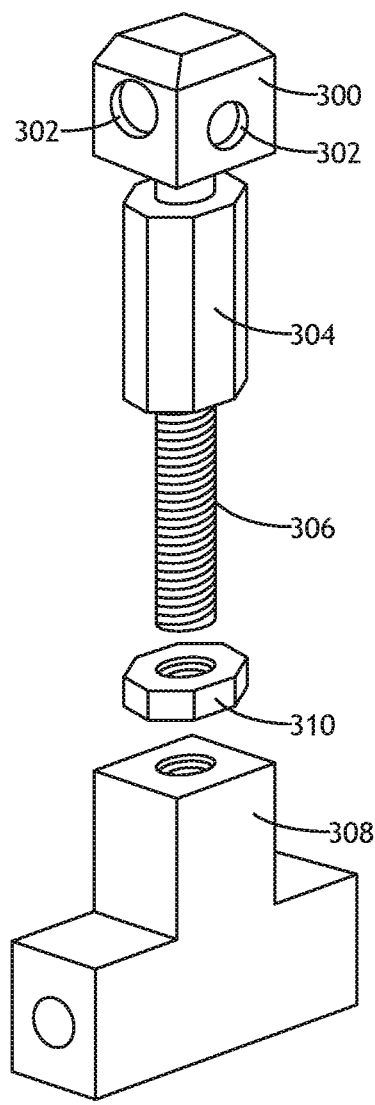
FIG. 3 shows a perspective view of an exemplary embodiment of an adjustable brew head linkage.

Referring to FIG. 3, a perspective view of an exemplary embodiment of an adjustable brew head linkage is shown. A continuously adjustable linkage includes a handle engaging linkage element 300 that defines at least one pin through-hole 302 for connecting to a rotating handle element of a brewing machine. An adjusting element 304 is rotatably affixed to the handle engaging linkage element 300. The adjusting element 304 includes a threaded portion 306 disposed on a brew head proximal surface. The threaded portion 306 engages a threaded portion of a head engaging linkage element 308. The head engaging linkage element 308 may include a locking element 310 that may be tightened against the head engaging linkage element 308 to create sufficient friction with the threaded portion 306 and prevent the adjusting element 304 from rotating.

Figure 4:
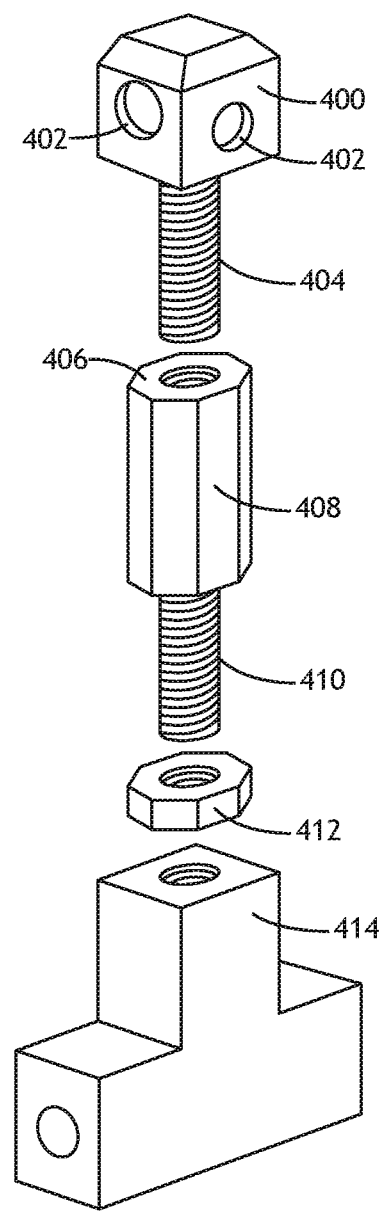
FIG. 4 shows a perspective view of an exemplary embodiment of an adjustable brew head linkage.

Referring to FIG. 4, a perspective view of an exemplary embodiment of an adjustable brew head linkage is shown. A continuously adjustable linkage includes a handle engaging linkage element 400 that defines at least one pin through-hole 402 for connecting to a rotating handle element of a brewing machine and a threaded portion 404 for engaging a corresponding threaded portion 406 of an adjusting element 408. The adjusting element 408 includes a threaded protrusion 410 configured to engage a threaded portion of a brew head engaging linkage element 414. In at least one embodiment, a locking element 412 is configured to prevent the adjusting element from rotating by engaging the threaded protrusion 410 and applying a force to the brew head engaging linkage element 414.

In at least one embodiment, the threaded portion 404 of the handle engaging linkage element 400 and the threaded protrusion 410 of the adjusting element have opposite handedness. Opposite handedness allows a single rotation of the adjusting element 408 to be reflected twice in terms of extension or retraction of the distance between the handle engaging linkage element 400 and head engaging linkage element 414.

In at least one embodiment, the threaded portion 404 of the handle engaging linkage element 400 and the threaded protrusion 410 of the adjusting element have the same handedness but different pitch. Different pitches allow a single rotation of the adjusting element 408 to produce a smaller displacement change than possible with either threaded portion 404, 410 alone for greater precision and tighter tolerances.

Figure 5:
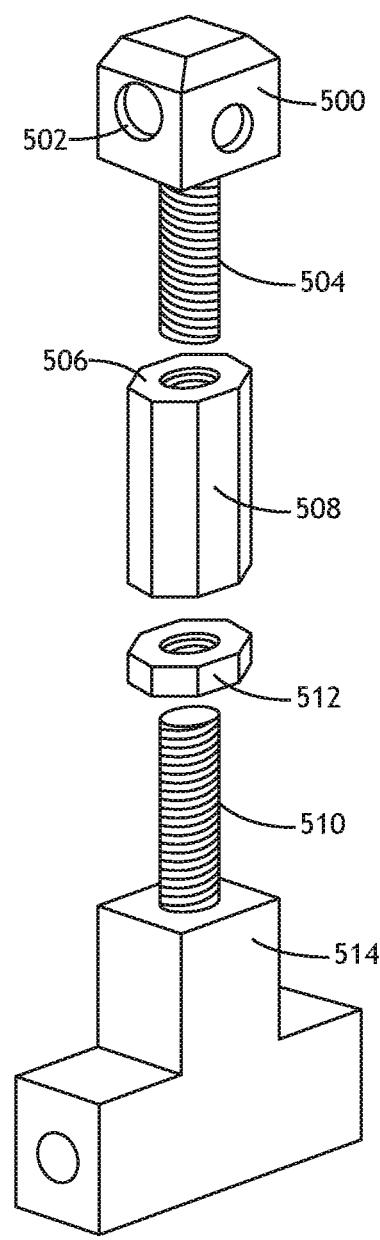
FIG. 5 shows a perspective view of an exemplary embodiment of an adjustable brew head linkage.

Referring to FIG. 5, a perspective view of an exemplary embodiment of an adjustable brew head linkage is shown. A continuously adjustable linkage includes a handle engaging linkage element 500 that defines at least one pin throughhole 502 for connecting to a rotating handle element of a brewing machine and a threaded portion 504 for engaging a corresponding threaded portion 506 of an adjusting element 508. The corresponding threaded portion 506 may extend through the entire length of the adjusting element 508, either as a continuous threaded feature or separate threaded features having different handedness or pitch or both, one beginning from a proximal end of the adjusting element 508 and another beginning from a distal end of the adjusting element 508. In such embodiment, the threaded portion 504 of the handle engaging linkage element 500 is configured to engage the proximal end of the adjusting element. A threaded rod 510 is configured to engage the distal end of the adjusting element 508 and a proximal end of a brew head engaging linkage element 514. In at least one embodiment, a locking element 512 is configured to prevent the adjusting element from rotating by engaging the threaded rod 510 and applying a force to the adjusting element 508.

In at least one embodiment, the threaded portion 504 of the handle engaging linkage element 500 and the threaded rod 510 have opposite handedness to allow a single rotation of the adjusting element 508 to be reflected twice in terms of extension or retraction of the distance between the handle engaging linkage element 500 and brew head engaging linkage element 514. Alternatively, or in addition, the threaded portion 504 of the handle engaging linkage element 500 and the threaded rod 510 have different pitch for greater precision and tighter tolerances.

Figure 6:
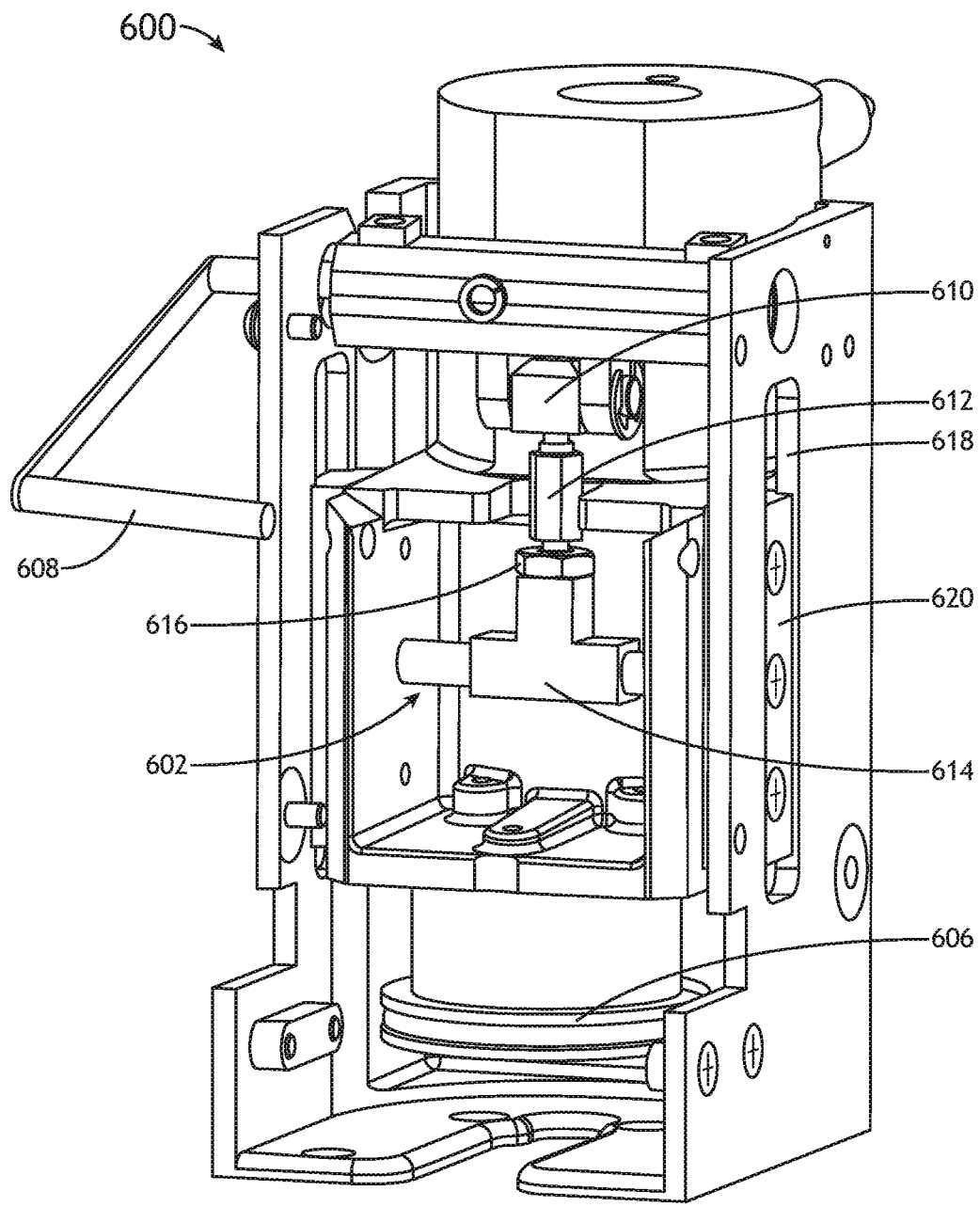
FIG. 6 shows an environmental view of an exemplary embodiment of an adjustable brew head linkage.

Referring to FIG. 6, an environmental view of an exemplary embodiment of an adjustable brew head linkage 602 is shown. A brew head assembly 600 includes the adjustable brew head linkage 602 disposed between a rotating handle element 604 and a linearly displaceable brew head 606 that forms a portion of brew chamber configured to receive various brew pods and inject hot water into the brew pod to produce a brewed beverage such as coffee, espresso, tea, etc.

A user operated handle 608 imparts a rotational motion to the rotating handle element 604. The rotational motion is translated into linear motion of the linearly displaceable brew head 606 via the adjustable brew head linkage 602. In at least one embodiment, the adjustable brew head linkage 602 comprises a handle engaging linkage element 610 rotatably affixed to the rotating handle element 604, and connected to an adjusting element 612, either rotatably or via a threaded portion as more fully described herein. The adjusting element 612 is connected to a head engaging linkage element 614. The head engaging linkage element 614 may be raised or lowered by turning the adjusting element 612 to accommodate various sizes of brew pods, tailoring the size of the corresponding brew chamber to tightly conform to such brew pods. The adjusting element 612 is operable at any time, even when the brewing machine is installed in a vehicle, without removing any connecting elements between the adjustable brew head linkage 612 and either the rotating handle element 604 or the brew head 606. A set displacement of the brew head 606 may be secured via a locking element 616.

In at least one embodiment, the rotational motion of the rotating handle element 604 is translated into linear motion in the brew head 606 via one or more vertical channels 618 in a corresponding brewing machine and corresponding sliders 620 connected to the brew head 606. Alternatively, or in addition, the brew head 606 may define one or more guide holes disposed to engage stationary vertical pins or rails to define the range of motion of the brew head 606.

Embodiments may be configured in accordance with guidelines and/or standards put forth by, but not limited to, the Federal Aviation Administration (FAA), the European Aviation Safety Agency (EASA) or any other flight certification agency or organization; the American National Standards Institute (ANSI), Aeronautical Radio, Incorporated (ARINC), or any other standards setting organization or company; the Radio Technical Commission for Aeronautics (RTCA) or any other guidelines agency or organization; or the like.

It is believed that the inventive concepts disclosed herein and many of their attendant advantages will be understood by the foregoing description of embodiments of the inventive concepts disclosed, and it will be apparent that various changes may be made in the form, construction, and arrangement of the components thereof without departing from the broad scope of the inventive concepts disclosed herein or without sacrificing all of their material advantages; and individual features from various embodiments may be combined to arrive at other embodiments. The form herein before described being merely an explanatory embodiment thereof, it is the intention of the following claims to encompass and include such changes. Furthermore, any of the features disclosed in relation to any of the individual embodiments may be incorporated into any other embodiment.

What is claimed is:

1. An adjustable linkage comprising:
a brew head engaging linkage element;
a handle engaging linkage element;
an adjusting element disposed between the brew head engaging linkage element and the handle engaging linkage element and
a secondary brew head linkage locking element disposed on the brew head engaging linkage element configured to engage the threaded portion and apply a force to prevent the adjusting element from rotating,
wherein:
the adjusting element is configured to engage the brew head engaging linkage element and the handle engaging linkage element;
the adjusting element is configured to smoothly increase and decrease a distance between the brew head engaging linkage element and the handle engaging linkage element;
the brew head engaging linkage element comprises a threaded portion configured to engage a first threaded portion of the adjusting element; and
the handle engaging linkage element comprises a threaded portion configured to engage a second threaded portion of the adjusting element.

2. The adjustable linkage of claim 1, wherein the first threaded portion and the second threaded portion comprise opposite handedness.

3. The adjustable linkage of claim 1, wherein the first threaded portion and the second threaded portion comprise different pitches.

4. The adjustable linkage of claim 1, wherein:
the adjusting element is rotatably affixed to the handle engaging linkage element;
the adjusting element comprises a threaded portion; and
the adjusting element threaded portion is configured to engage a threaded portion of the brew head engaging linkage element.

5. The adjustable linkage of claim 1, wherein the adjusting element is configured to increase and decrease the distance between the brew head engaging linkage element and the handle engaging linkage element in increments smaller than 0.178 millimeters (7/1000 inches).

6. The adjustable linkage of claim 1, wherein:
the adjusting element is rotatably affixed to the handle engaging linkage element;
the adjusting element comprises a threaded portion; and
the adjusting element threaded portion is configured to engage a threaded portion of the brew head engaging linkage element.

7. A brewing apparatus comprising:
an adjustable linkage comprising:
a brew head engaging linkage element;
a handle engaging linkage element;
an adjusting element disposed between the brew head engaging linkage element and the handle engaging linkage element; and
a secondary head linkage locking element disposed on the brew head engaging linkage element configured to engage the threaded portion and apply a force to prevent the adjusting element from rotating,
wherein:
the adjusting element is configured to engage the brew head engaging linkage element and the handle engaging linkage element;
the adjusting element is configured to smoothly increase and decrease a distance between the brew head engaging linkage element and the handle engaging linkage element;
the brew head engaging linkage element comprises a threaded portion configured to engage a first threaded portion of the adjusting element; and
the handle engaging linkage element comprises a threaded portion configured to engage a second threaded portion of the adjusting element.

8. The brewing apparatus of claim 7, wherein the first threaded portion and the second threaded portion comprise opposite handedness.

9. The brewing apparatus of claim 7, wherein the first threaded portion and the second threaded portion comprise different pitches.

10. The brewing apparatus of claim 7, wherein the adjusting element is configured to increase and decrease the distance between the brew head engaging linkage element and the handle engaging linkage element in increments smaller than 0.178 millimeters (7/1000 inches).

11. A brewing apparatus configured for installation in an aircraft having an adjustable linkage comprising:
a brew head engaging linkage element;
a handle engaging linkage element;
an adjusting element disposed between the brew head engaging linkage element and the handle engaging linkage element; and
a secondary head linkage locking element disposed on the brew head engaging linkage element configured to engage the threaded portion and apply a force to prevent the adjusting element from rotating,
wherein:
the adjusting element is configured to engage the brew head engaging linkage element and the handle engaging linkage element;
the adjusting element is configured to smoothly increase and decrease a distance between the brew head engaging linkage element and the handle engaging linkage element;
the brew head engaging linkage element comprises a threaded portion configured to engage a first threaded portion of the adjusting element; and
the handle engaging linkage element comprises a threaded portion configured to engage a second threaded portion of the adjusting element.

12. The brewing apparatus of claim 11, wherein the first threaded portion and the second threaded portion comprise opposite handedness.

13. The brewing apparatus of claim 11, wherein:
the adjusting element is rotatably affixed to the handle engaging linkage element;
the adjusting element comprises a threaded portion; and
the adjusting element threaded portion is configured to engage a threaded portion of the brew head engaging linkage element.

14. The brewing apparatus of claim 11, wherein the adjusting element is configured to increase and decrease the distance between the brew head engaging linkage element and the handle engaging linkage element in increments smaller than 0.178 millimeters (7/1000 inches).

* * * * *